US011505191B2

(12) United States Patent
Mizoguchi

(10) Patent No.: US 11,505,191 B2
(45) Date of Patent: Nov. 22, 2022

(54) VEHICLE TRAVELING CONTROL DEVICE

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 237 days.

(21) Appl. No.: 16/658,922

(22) Filed: Oct. 21, 2019

(65) Prior Publication Data

US 2020/0180626 A1    Jun. 11, 2020

(30) Foreign Application Priority Data

Dec. 6, 2018   (JP) .............................. JP2018-229141

(51) Int. Cl.
*B60W 30/18*    (2012.01)
*B60W 10/18*    (2012.01)
*B60W 10/20*    (2006.01)

(52) U.S. Cl.
CPC ............ *B60W 30/18* (2013.01); *B60W 10/18* (2013.01); *B60W 10/20* (2013.01);
(Continued)

(58) Field of Classification Search
CPC ...... B60W 30/18; B60W 10/18; B60W 10/20; B60W 2555/60; B60W 2400/00; B60W 2520/14; B60W 2710/18; B60W 2710/20
See application file for complete search history.

(56) References Cited

U.S. PATENT DOCUMENTS

2005/0216161 A1 *  9/2005  Sakugawa ............. B60W 10/18
                                                           701/70
2016/0236679 A1    8/2016  Inoue et al.
(Continued)

FOREIGN PATENT DOCUMENTS

DE    102009025058 A1    12/2009
JP    2010-058691 A       3/2010
(Continued)

OTHER PUBLICATIONS

Japanese Notice of Reasons for Refusal issued in corresponding Japanese Patent Application No. 2018-229141, dated Jul. 26, 2022, with English translation.

*Primary Examiner* — Nicholas Kiswanto
*Assistant Examiner* — Jamal A Shah
(74) *Attorney, Agent, or Firm* — McDermott Will & Emery LLP

(57) ABSTRACT

The steering controller calculates a target steering angle for causing the own vehicle to travel along the target course acquired by the traveling road information acquirer. The braking/driving force controller calculates a target yaw moment for correcting the positional displacement of the own vehicle from the target course. The control ratio setter sets a control ratio of cooperative control of steering control and yaw moment control based on the deviation amount of a lateral position of the own vehicle from the target course. The control ratio is set so that when the positional displacement of the own vehicle from the target course is relatively small, the ratio at which the steering control occupies is reduced, and the yaw moment control is dominant, and when the positional displacement of the own vehicle from the target course is relatively large, the ratio at which the steering control occupies is increased.

7 Claims, 4 Drawing Sheets

(52) U.S. Cl.
CPC ..... *B60W 2400/00* (2013.01); *B60W 2520/14* (2013.01); *B60W 2555/60* (2020.02); *B60W 2710/18* (2013.01); *B60W 2710/20* (2013.01)

(56) References Cited

U.S. PATENT DOCUMENTS

| | | |
|---|---|---|
| 2018/0273026 A1 | 9/2018 | Oyama |
| 2020/0398868 A1* | 12/2020 | Horii .................. G08G 1/16 |
| 2021/0309192 A1* | 10/2021 | Balogh ............... B60T 8/17557 |

FOREIGN PATENT DOCUMENTS

| | | |
|---|---|---|
| JP | 2016-150683 A | 8/2016 |
| JP | 2018-161996 A | 10/2018 |
| JP | 2018-167731 A | 11/2018 |
| JP | 2018-167734 A | 11/2018 |

* cited by examiner

VEHICLE TRAVELING CONTROL DEVICE

CROSS-REFERENCE TO RELATED APPLICATIONS

The present application claims priority from Japanese Patent Application No. 2018-229141 filed on Dec. 6, 2018, the entire contents of which are hereby incorporated by reference.

BACKGROUND

The technology relates to a vehicle traveling control device for controlling vehicle traveling by steering control and braking/driving force distribution control of wheels so that a vehicle travels along a target course.

Technologies in which yaw moments are generated in vehicles by steering control and braking/driving force distribution control to perform driving support control such as lane keeping control and lane departure prevention control, and automatic driving control have been developed and put into practical use in vehicles.

For example, Japanese Unexamined Patent Application Publication (JP-A) No. 2018-167731 discloses a technology in which feedforward control for causing a vehicle to travel along the shape of a target course is performed by steering control, and feedback control for correcting positional displacement of an own vehicle from the target course is performed by braking/driving force distribution control (yaw moment control).

SUMMARY

An aspect of the disclosure provides a vehicle traveling control device configured to control an own vehicle to travel along a target course. The device includes a steering controller, a braking/driving force controller, and a control ratio setter. The steering controller calculates a steering control amount for causing the own vehicle to travel along the target course, and controls a steering system of the own vehicle based on the calculated steering control amount. The braking/driving force controller calculates a yaw moment to be applied to the own vehicle based on a deviation amount of the own vehicle from the target course, and controls a braking/driving force distribution of wheels based on the calculated yaw moment. The control ratio setter sets, based on a lateral positional deviation in a vehicle width direction of the own vehicle from the target course, a control ratio of steering control by the steering controller and braking/driving force distribution control by the braking/driving force controller when a positional displacement of the own vehicle from the target course is corrected, and causes the steering control and the braking/driving force distribution control to be performed at the set control ratio, thereby correcting the positional displacement of the own vehicle from the target course.

An aspect of the disclosure provides a vehicle traveling control device comprising circuitry configured to control an own vehicle to travel along a target course. The circuitry is configured to calculate a steering control amount for causing the own vehicle to travel along the target course, and controlling a steering system of the own vehicle based on the calculated steering control amount. The circuitry is configured to calculate a yaw moment to be applied to the own vehicle based on a deviation amount of the own vehicle from the target course, and control braking/driving force distribution of wheels based on the calculated yaw moment. The circuitry is configured to, based on a lateral positional deviation in a vehicle width direction of the own vehicle from the target course, set a control ratio of steering control and braking/driving force distribution control when a positional displacement of the own vehicle from the target course is corrected, and causing the steering control and the braking/driving force distribution control to be performed at the set control ratio, thereby correcting the positional displacement of the own vehicle from the target course.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A description is given below of some embodiments of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following embodiments which are not recited in a most-generic independent claim of the disclosure are optional and may be provided on an as-needed basis. The drawings are schematic and are not intended to be drawn to scale.

In a case where the positional displacement of an own vehicle from a target course increases due to disturbance or the like, when the positional displacement is corrected by yaw moment control which does not involve any motion of a steering system, intention of control of the system cannot be fully communicated to a driver, so that the driver may feel uncomfortable.

Therefore, it is desirable in the technology to provide a vehicle traveling control device that appropriately transmits a control intention on a system side to a driver when correcting a positional displacement of an own vehicle from a target course, and corrects the positional displacement without making the driver feel uncomfortable, whereby the vehicle can be caused to accurately follow the target course.

Figure 1:
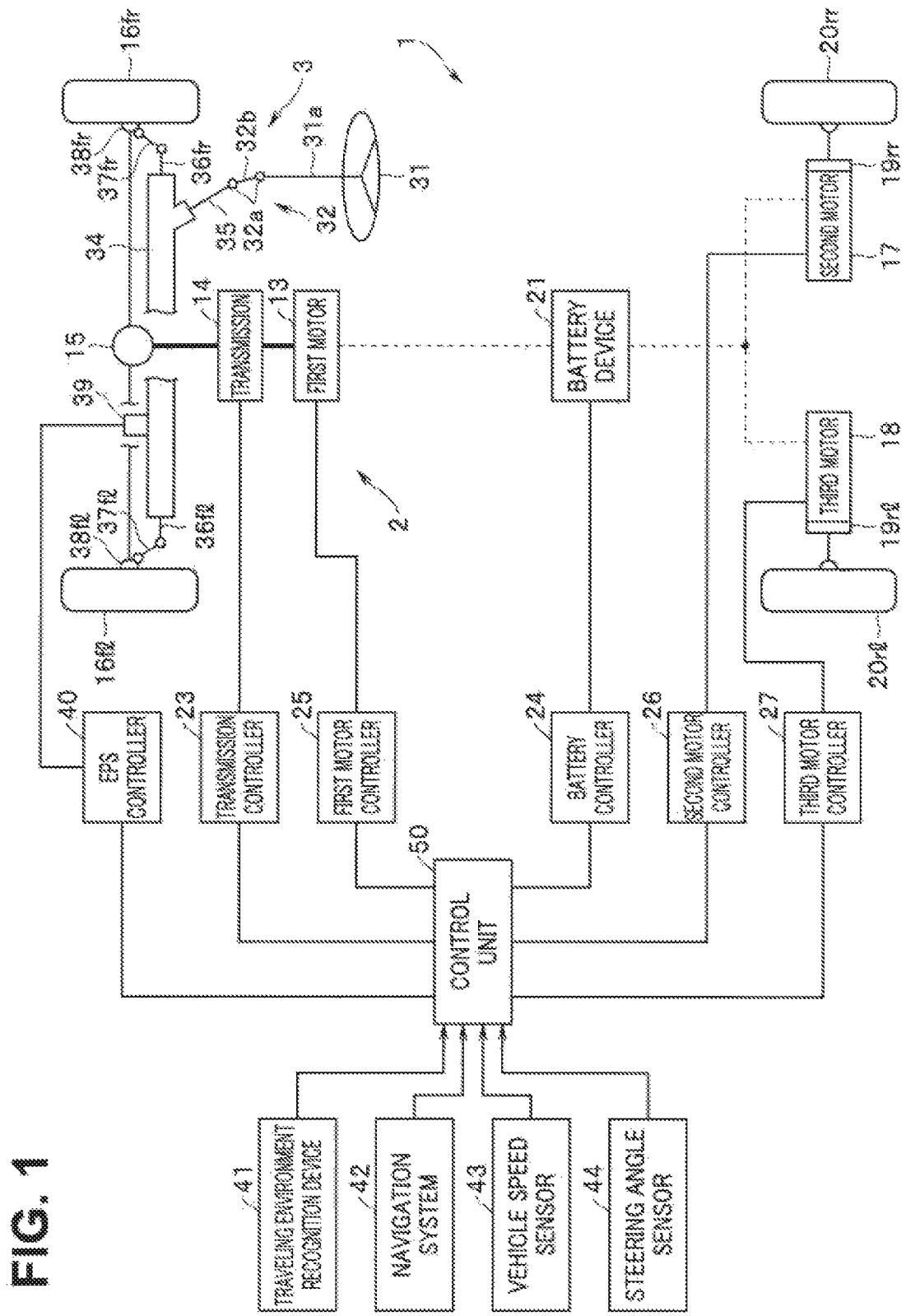
FIG. 1 is an overall configuration diagram of a vehicle.

An embodiment of the technology will be described below with reference to the drawings. In FIG. 1, reference numeral 1 represents an own vehicle, reference numeral 2 represents a driving system of the own vehicle 1, and reference numeral 3 represents a steering system of the own vehicle 1. The driving system 2 has a four-wheel-drivable configuration including a front wheel driving force transmission path configured by a first motor 13, a transmission 14, a deceleration device 15, and driving wheels (a front left wheel 16*fl* and a front right wheel 16*fr*), and a rear wheel driving force transmission path configured by a second motor 17, a third motor 18, deceleration devices (a left deceleration device 19*rl* and a right deceleration device 19*rr*) and driving wheels (a rear left wheel 20*rl* and a rear right wheel 20*rr*).

In the front wheel driving force transmission path, the driving force of the first motor 13 is transmitted to the driving wheels on a front side (the front left wheel 16*fl* and the front right wheel 16*fr*) via the transmission 14 and the deceleration device 15. In the rear wheel driving force transmission path, the driving force of the second motor 17 is transmitted to the rear right wheel 20*rr* via the right deceleration device 19*rr*, and the driving force of the third motor 18 is transmitted to the rear left wheel 20*rl* via the left deceleration device 19*rl*.

The first motor 13 is an electric motor to be driven with electric power stored in a battery device 21, and generates electric power by using regenerative energy during deceleration to store the generated electric power in the battery device 21. The second motor 17 and the third motor 18 are electric motors to be driven with at least one of the power stored in the battery device 21 or the power generated by the first motor 13.

A state of the battery device 21 is monitored by a battery controller 24. The battery controller 24 detects a voltage and a current of the battery device 21 to calculate a state of charge (SOC) of the battery, and controls the state of charge of the battery device 21.

A transmission controller 23 controls a gear ratio of the transmission 14 based on a shift command value output from a control unit 50. Note that the transmission 14 and the transmission controller 23 are not essential due to the characteristics of the first motor 13, and may be omitted. As described later, the control unit 50 is a device serving as a center device of the vehicle traveling control device for controlling the own vehicle 1 to travel along a target course.

A first motor controller 25, a second motor controller 26, and a third motor controller 27 control torques of the first motor 13, the second motor 17, and the third motor 18 based on a first motor torque command value, a second motor torque command value, and a third motor torque command value output from the control unit 50, respectively.

In the steering system 3 of the own vehicle 1, a steering shaft 31*a* extends from a steering wheel 31, and the front end of the steering shaft 31*a* is coupled to a pinion shaft 35 protruding from a steering gear box 34 via a joint 32 including a universal joint 32*a* and a joint shaft 32*b*.

A tie rod 36*fl* extends from the steering gear box 34 toward the front left wheel 16*fl* while a tie rod 36*fr* extends toward the front right wheel 16*fr*. Tie rod ends of the tie rods 36*fl* and 36*fr* are coupled to axle housings 38*fl* and 38*fr* that rotatably support the wheels 16*fl* and 16*fr* on the respective sides via knuckle arms 37*fl* and 37*fr*.

The steering system 3 of the own vehicle 1 is provided with an electric power steering (EPS) device 39 as a steering device which is capable of freely setting a steering angle independently of a driver's steering input. The EPS device 39 drives a well-known rack assist power steering mechanism or the like by a power steering motor, and the power steering motor is controlled based on a signal from an EPS controller 40.

The control unit 50 includes a camera device (stereo camera, monocular camera, color camera or the like), a radar device (laser radar, millimeter wave radar or the like), a sonar, etc., and is coupled to a traveling environment recognition device 41 for detecting information on a traveling environment in which the own vehicle travels, thereby recognizing the traveling environment, a navigation system 42 for detecting information on a position of the own vehicle (latitude/longitude, moving direction, etc.) to display the position of the own vehicle on map information and guide the own vehicle onto a route to a destination, sensors such as a vehicle speed sensor 43 for detecting a vehicle speed V and a steering angle sensor 44 for detecting a steering angle δ, and switches.

For example, when the traveling environment recognition device 41 is configured by a stereo camera, the stereo camera includes a pair of cameras that are fitted to a front side of the ceiling in the vehicle interior so as to be spaced from each other at a certain interval and captures stereo images of an object outside the vehicle from different viewpoints, and a stereo image processing device for processing image data from the cameras. The processing of the image data from the cameras in the stereo image processing device is performed as follows, for example. First, distance information is obtained from a deviation amount between corresponding positions with respect to a pair of stereo images in a traveling direction of the own vehicle captured by the cameras to generate a distance image.

In recognition of data of lane markings such as lane lines, the positions of right and left lane markings on an image plane are specified on the image plane by evaluating variation in brightness in a width direction of a road based on the knowledge that the lane line is brighter than a road surface. A position (x, y, z) of the lane marking in a real space is calculated from a well-known coordinate transformation formula based on a position (i, j) on the image plane and a parallax calculated for the position, that is, based on the distance information. In the present embodiment, the coordinate system of the real space which is set with the position of the own vehicle set as a basis is set so that the road surface just below the center between the cameras is set as an origin, a vehicle length direction (distance direction) is set as a z-axis, a vehicle width direction is set as an x-axis, and a vehicle height direction is set as a y-axis. At this time, the x-z plane (y=0) coincides with the road surface when the road is flat.

The traveling environment recognition device 41 performs well-known grouping processing and comparison with prestored three-dimensional road shape data, three-dimensional object data, and the like on distance image data representing a three-dimensional distance distribution, thereby extracting sidewall data such as guardrails, curbs, and median strips existing along roads, and three-dimensional object data such as vehicles. For the three-dimensional object data, the distances to three-dimensional objects and time variations in the distances (relative speeds with respect to the own vehicle) are determined.

The navigation system 42, which is a well-known system, receives radio signals from a plurality of navigation satellites such as the Global Navigation Satellite System (GNSS) satellites to acquire position information (latitude, longitude) of the vehicle, and acquires movement locus information of the vehicle based on vehicle speed information from the vehicle speed sensor 43 and azimuth information from a geomagnetic sensor, a gyro sensor or the like. The navigation system 42 includes a navigation ECU that generates route information for realizing a navigation function, and a map database that stores map information (supplier data and predetermined updated data) (not illustrated above), and causes a notification device to output the information (not illustrated).

The navigation ECU causes the notification device to display route information to a destination specified by a user while superimposing the route information on a map image, and also to display the current position of the vehicle based on information on the detected vehicle position, speed, traveling direction, etc., while superimposing the current position of the vehicle on the map image.

The map database is a database containing a high-precision map created for control of traveling, and stored in a large-capacity storage medium such as a hard disk drive (HDD), a solid state drive (SSD) or the like. The high-precision map is configured, for example, as a multi-dimensional map (dynamic map) for holding static road information such as road shapes and connection relationships between roads, and dynamic information such as traffic information collected by infrastructure communication in multiple layers.

The road information includes, for example, data of the center point in the width direction of a road (lane), the coordinates (latitude, longitude) of a point (node point) on a road including road branch points (intersections), the direction of the road containing the node point, a classification of the road (for example, information such as expressway, arterial road or city road), the type of the road at the node point (straight section, arc section (arc curve section), clothoid curve section (relaxation curve section)), and curve curvature (alternatively, radius).

Based on respective input signals from the respective sensors 41 to 44 described above, the control unit 50 performs, as driving support control containing automatic driving, traveling control in which a target course on which the own vehicle 1 travels is set based on the traveling environment information of the own vehicle 1 and the own vehicle 1 is caused to travel along the shape of the target course. The traveling control to the target course is realized by performing both the steering control by the EPS device 39 of the steering system 3 and the yaw moment control by the second motor 17 and the third motor 18 of the drive system 2 in combination.

The steering control by the EPS device 39 mainly includes feedforward control for directing a traveling direction of the own vehicle to a direction along the target course by steering, and additionally includes feedback control based on a deviation between the actual rudder angle and the target steering angle. Since the steering angle to the target course is uniquely determined according to the geometric shape of the target course and the characteristics of the vehicle, it can be said that the steering control to the target course realizes an element of a human machine interface (HMI) which visually and instinctively communicates to a driver how the vehicle moves subsequently through a motion of the steering wheel 31.

In one example, the control unit 50 calculates a target steering angle δt for causing the own vehicle 1 to travel along the target course, and performs steering control by the EPS device 39 based on the target steering angle δt. The steering control is performed as cooperative control with the yaw moment control by the second motor 17 and the third motor 18 under a predetermined condition. Although details will be described later, when the positional displacement of the own vehicle from the target course is relatively small, a ratio at which the steering control occupies is reduced to mainly perform the yaw moment control, and when the positional displacement of the own vehicle from the target course is relatively large, the ratio at which the steering control occupies is increased to cause control intention of the system to be appropriately communicated to the driver.

With respect to the yaw moment control by the second motor 17 and the third motor 18, when the positional displacement of the own vehicle from the target course is relatively small, the yaw moment control is performed as control for correcting the positional displacement by the yaw moment. The reason why the position of the own vehicle deviates from the target course in the steering control to the target steering angle δt resides in uncertain factors such as disturbance and response delay of the vehicle, and the positional displacement is reduced by the control based on the yaw moment at an early stage.

The yaw moment control has less necessity for communicating information to the driver as compared with the steering control having an HMI-like element, and it often merely bothers the driver even when information is communicated to the driver. Therefore, the yaw moment control is control to be performed in the background with respect to the steering control. The control unit 50 calculates a control amount for causing the own vehicle to travel so that the deviation amount from the target course of the own vehicle is nullified, and calculates a target yaw moment Mz to be applied to the own vehicle based on the control amount. Then, a braking/driving force distribution between the right and left wheels based on the target yaw moment Mz is controlled via the second motor 17 and the third motor 18.

Figure 2:
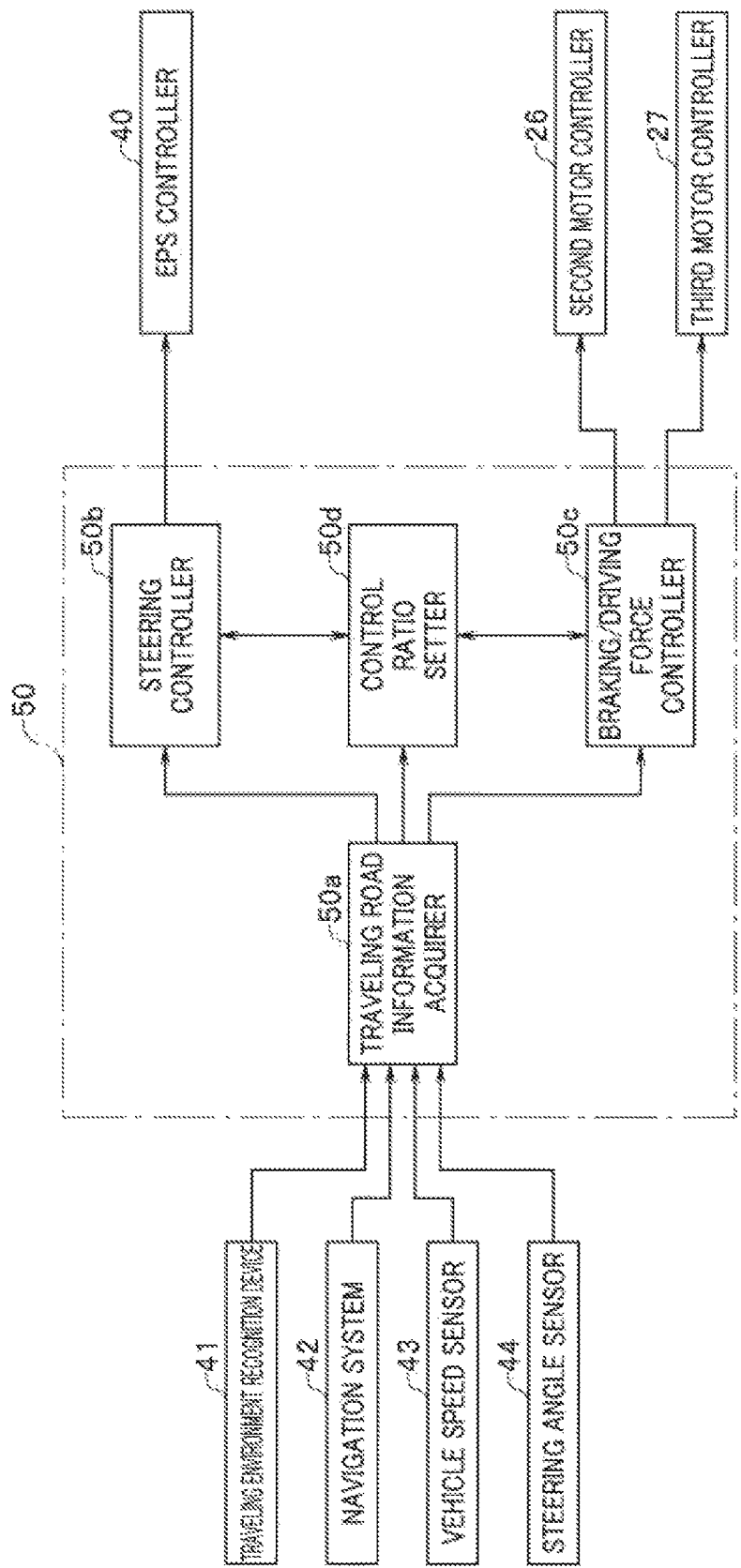
FIG. 2 is a functional block diagram of a control unit.

Next, a functional configuration of the control unit 50 that realizes the above control function will be described. As illustrated in FIG. 2, the control unit 50 includes a traveling road information acquirer 50a, a steering controller 50b, a braking/driving force controller 50c, and a control ratio setter 50d. The control unit 50 performs the steering control via the steering controller 50b and the yaw moment control via the braking/driving force controller 50c, and also performs the cooperative control of the steering control and the yaw moment control at a control ratio set by the control ratio setter 50d according to the traveling state.

Based on the respective signals input from the respective sensors 41 to 44, the traveling road information acquirer 50a recognizes a lane on which the own vehicle travels, and sets a target course. In the present embodiment, the center of the traveling lane is set as a target course. The traveling road information acquirer 50a acquires a curvature κ of the target course, a lateral positional deviation of the own vehicle 1 (the deviation amount between the target course and the own vehicle position in the width direction) Δx, and a yaw-angle-to-lane (the deviation amount between the traveling direction of the target course and the traveling direction of the own vehicle 1) θt based on the position information of the lane markings and the position information of the target course from the traveling environment recognition device 41 and the navigation system 42.

The traveling road information acquirer 50a outputs the acquired curvature κ of the target course to the steering controller 50b, and outputs the deviation amount Δx between the target course and the own vehicle position in the width direction of the own vehicle 1 to the steering controller 50b, the braking/driving force controller 50c and the control ratio setter 50d. Further, the deviation amount θt in angle between the traveling direction of the target course and the traveling direction of the own vehicle 1 is output to the steering controller 50b and the braking/driving force controller 50c.

Based on the curvature κ of the target course output from the traveling road information acquirer 50a, the steering controller 50b calculates a steering angle based on feedforward control for the curvature of the target course (feedforward steering angle) δtff, for example, by the following equation (1). Here, Gff in the equation (1) represents a feedforward gain set in advance through an experiment, a simulation or the like.

$$\delta tff = Gff \cdot K \quad (1)$$

The steering controller 50b calculates a steering angle δx for correcting the deviation amount Δx between the target course and the own vehicle position in the width direction of the own vehicle 1, and a steering angle δy for correcting the deviation amount θt in angle between the traveling direction of the target course and the traveling direction of the own vehicle 1, and sums these steering angles δx and δy as indicated in the following equation (2) to calculate a correction steering angle δth for correcting a feedforward steering angle δtff. Here, Gl in the equation (2) represents a feedback gain for the lateral position of the vehicle, Gy represents a feedback gain for the yaw angle of the vehicle, and Gl and Gy are set in advance by an experiment, a simulation, or the like.

$$\delta th = \delta x + \delta y = Gl \cdot \Delta x + Gy \cdot \theta t \quad (2)$$

The steering controller 50b receives a control ratio K1 described later from the control ratio setter 50d, multiplies the correction steering angle δth by the control ratio K1 to correct the correction steering angle δth, and then adds the corrected correction steering angle δth to the feedforward steering angle δtff to calculate a target steering angle δt as a steering control amount for following the target course as indicated by the following equation (3). The target steering angle δt is output to the EPS controller 40, and steering control to the target steering angle δt is performed.

$$\delta t = \delta tff + K1 \cdot \delta th \quad (3)$$

The EPS controller 40 calculates a control torque of the EPS device 39 that realizes the target steering angle δt based on the target steering angle δt calculated by the steering controller 50b. Then, the control torque is multiplied by a predetermined torque-current conversion gain or the like to be converted into a current instruction value for the power steering motor of the EPS device 39, and the power steering motor is driven with the converted current instruction value.

The braking/driving force controller 50c calculates a yaw moment that compensates for the positional displacement of the own vehicle from the target course, which is input from the traveling road information acquirer 50a. The yaw moment mainly includes a yaw moment Mzh corresponding to the correction steering angle δth in the steering control, and is calculated by calculation or referring to a map.

For example, when a yaw rate required for curve tracing is represented by γm, the wheelbase of the vehicle is represented by Lw, a stability factor unique to the vehicle is represented by As, a curve radius is represented by ρ, cornering power of the front wheels is represented by Kf, cornering power of the rear wheels is represented by Kr, and a yaw moment required for curve tracing is represented by Mzc, a yaw rate γm required for curve tracing can be determined by the following equation (4) from the equation of motion of the vehicle.

$$\gamma m = V/\rho = (1/(1+As \cdot V2)) \cdot (V/Lw) \cdot (\delta + ((Kf+Kr)/(2 \cdot Lw \cdot Kf \cdot Kr)) \cdot Mzc \quad (4)$$

Therefore, from the equation (4), the yaw moment Mzh required for the curve tracing in a case of the correction steering angle δth being (δ=δth) can be calculated by the following equation (5).

$$Mzh = ((1+As \cdot V2) \cdot Lw/\rho - \delta th) \cdot (2 \cdot Lw \cdot Kf \cdot Kr)/(Kf+Kr) \quad (5)$$

The yaw moment Mzh based on the equation (5) is corrected based on a control ratio K2 input from the control ratio setter 50d under the cooperative control with the steering control, and output as a yaw moment to be applied to the own vehicle 1. In the present embodiment, with the yaw moment Mzh as a basis, as indicated in the following equation (6), the yaw moment Mzh is added with a yaw moment Mzix based on disturbance, and then multiplied by the control ratio K2 to be corrected, thereby setting a target yaw moment Mz to be applied to the own vehicle 1.

$$Mz = K2 \cdot (Mzh + Mzix) \quad (6)$$

The yaw moment Mzix in the equation (6) is a yaw moment that is set according to the deviation amount between the target course and the own vehicle position in the width direction of the own vehicle which is caused by disturbance acting on the own vehicle, and the yaw moment Mzix is set by referring to a map which is set in advance by an experiment, a simulation or the like. In this case, the deviation amount between the target course and the own vehicle position in the width direction of the own vehicle caused by disturbance acting on the own vehicle is represented, for example, as "∫(Δx)dt" by using an integral value of Δx. The yaw moment Mzix is not necessarily required, and may be omitted.

The braking/driving force controller 50c calculates a motor torque Trl to be generated by the third motor 18 and a motor torque Trr to be generated by the second motor 17 based on the target yaw moment Mz to be applied to the own vehicle 1 ("+" for counterclockwise), for example, by the following equations (7) and (8). In the equations (7) and (8), rt represents the tire radius and d represents the tread.

$$Trl = -(rt/d) \cdot \Delta Mz \quad (7)$$

$$Trr = +(rt/d) \cdot \Delta Mz \quad (8)$$

The braking/driving force controller 50c outputs the motor torque Trl to the third motor controller 27, and also outputs the motor torque Trr to the second motor controller 26 to control the braking/driving force distribution between the right and left wheels via the second motor 17 and the third motor 18.

When the positional displacement of the own vehicle 1 from the target course is corrected by the steering control and the yaw moment control, the control ratio setter 50d sets the control ratios K1 and K2 for the steering control and the yaw moment control based on the deviation amount Δx of the own vehicle from the target course, and outputs the control ratios K1 and K2 to the steering controller 50b and the braking/driving force controller 50c. In particular, when the positional displacement of the lateral position of the own vehicle from the target course increases and thus it falls into a situation that it is difficult to communicate the control intention of the system to the driver only by the yaw moment control, the cooperative control between the steering control and the yaw moment control based on the control ratios K1 and K2 is performed, and the positional displacement of the own vehicle 1 from the target course is corrected while communicating the control intention of the system to the driver.

Figure 3:
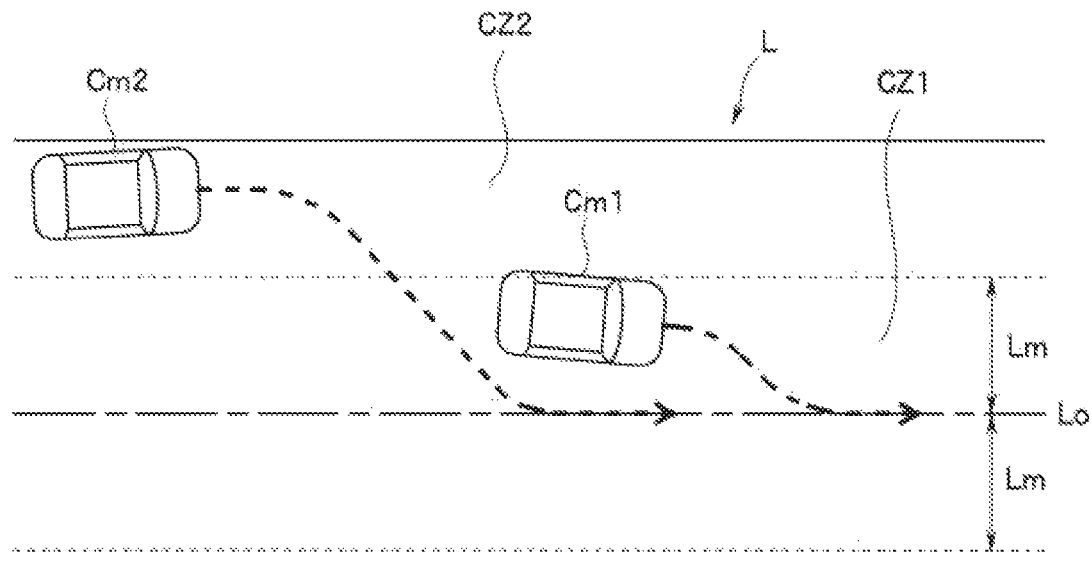
FIG. 3 is an explanatory diagram illustrating a control range of steering control and yaw moment control.

Therefore, as illustrated in FIG. 3, a first control zone CZ1 in which the yaw moment control is performed, and a second control zone CZ2 in which the cooperative control between the steering control and the yaw moment control is performed are defined based on right and left threshold value Lm with respect to a target course Lo (the center of the traveling lane L in the present embodiment). The threshold value Lm defining the first control zone CZ1 and the second control zone CZ2 is boundary value within a range where the driver does not feel uncomfortable even when the yaw moment control is performed without moving the steering wheel 31 to correct the positional displacement of the own vehicle from the target course, and is determined in advance by an experiment or a simulation that takes vehicle characteristics and driver's sensitivity into consideration.

In the present embodiment, the control ratios K1 and K2 represent the ratio of the correction steering angle δth in the target steering angle δt (see the equation (3)) and the correction ratio of the target yaw rate Mz (see the equation (6)), respectively. In the first control zone CZ1, K1=0 is set and the yaw moment control is mainly performed. In the second control zone CZ2, the control ratios K1, K2 are set as follows. When the positional displacement of the own vehicle from the target course L is relatively small, the ratio at which the steering control occupies is reduced, and the yaw moment control is mainly performed. On the other hand, when the positional displacement of the own vehicle from the target course is relatively large, the ratio at which the steering control occupies is increased.

Figure 4:
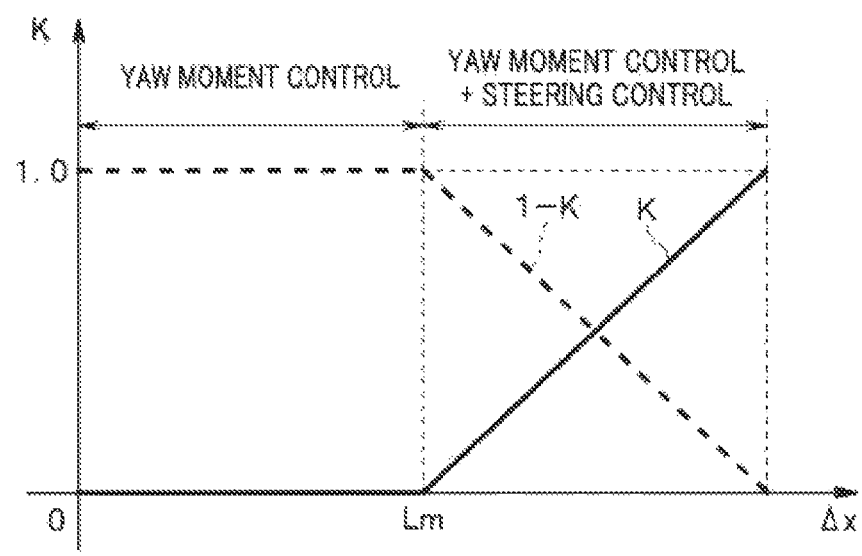
FIG. 4 is an explanatory diagram illustrating change in a control ratio of steering control and yaw moment control.

For example, the control ratios K1 and K2 are set so that K1=K and K2=(1−K), and the control ratios K and (1−K) are set to a characteristic illustrated in FIG. 4. In other words, a characteristic as described below is set. When the own vehicle is located in the first control zone CZ1 within the threshold values Lm, the control ratio K represented by a solid line in FIG. 4 is set to K=0. When the own vehicle is located in the second control zone CZ2, according to increase of the deviation amount Δx, the control ratio K linearly increases while the control ratio (1−K) represented by a broken line in FIG. 4 decreases linearly, and finally K is equal to 1.

In the first control zone CZ1, since K=0 and thus K1=K=0, as is apparent from the above-described equation (2), the correction amounts for the deviation amount Δx of the lateral position from the target course and the deviation amount θt of the yaw-angle-to-lane by the correction steering angle δth are equal to zero. With respect to the target yaw moment Mz at this time, since K=0 and K2=(1−K)=1, the yaw moment Mzh is dominant instead of the correction steering angle δth as is apparent from the above-described equation (6).

In other words, as illustrated in FIG. 3, when the own vehicle located in the first control zone CZ1 is indicated by Cm1, the own vehicle Cm1 is controlled so that the deviation from the target course Lo is eliminated by the control (K=0) based on only the target yaw moment Mz. The yaw moment control in this case is performed in the background with respect to the steering control, and it is possible to smoothly converge the own vehicle to the target course without bothering the driver with unnecessary information.

Further, as illustrated in FIG. 3, when the own vehicle located in the second control zone CZ2 is indicated by Cm2, the own vehicle Cm2 is controlled so that the deviation from the target course Lo is corrected by the cooperative control based on the correction steering angle K·δth and the yaw moment (1−K)·(Mzh+Mzix). In this case, when the deviation amount from the target course Lo is large, the control ratio K increases to make the steering control dominant, the control intention of the system can be appropriately communicated to the driver by the motion of the steering wheel 31, and the driver is not caused to feel uncomfortable. When the deviation amount from the target course Lo decreases, the control ratio K decreases to make the yaw moment control dominant, and it is possible to converge the own vehicle to the target course with high accuracy while suppressing information unnecessary for the driver.

Note that FIGS. 3 and 4 illustrate an example of a straight road, and illustrate a case where the feedforward steering angle δtff based on the curvature κ of the target course is zero.

Figure 5:
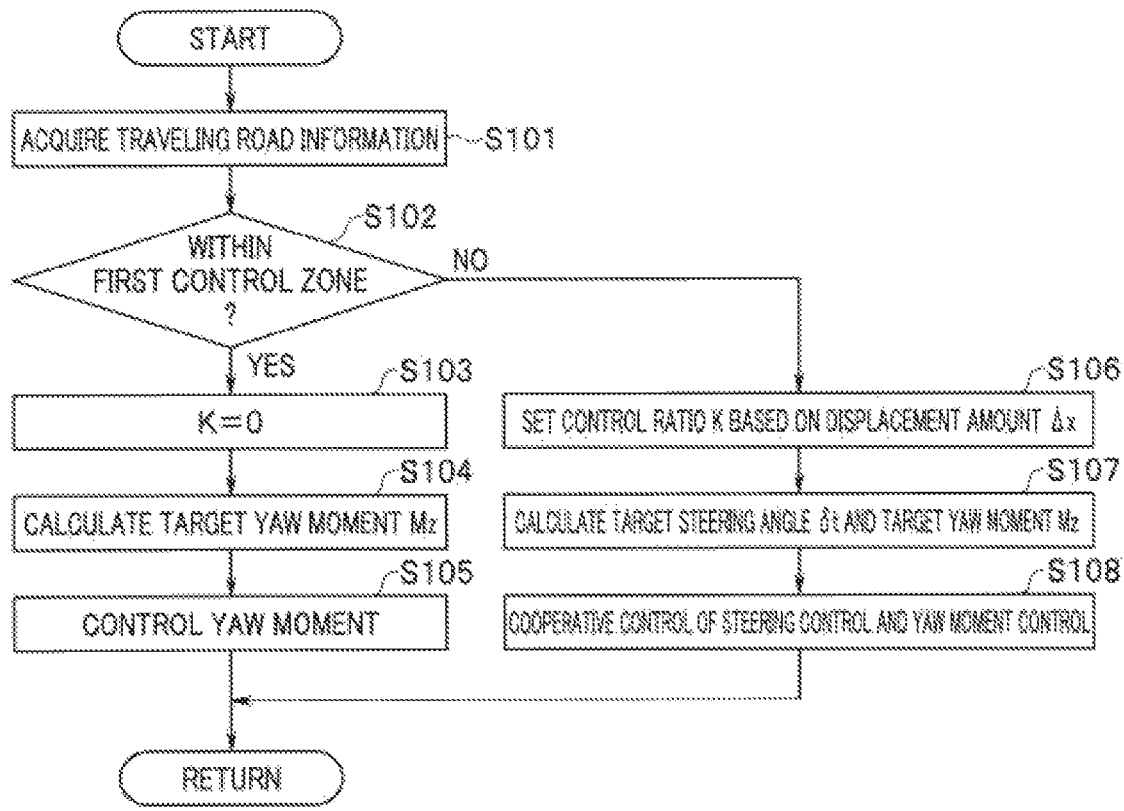
FIG. 5 is a flowchart illustrating program processing of a target course following control.

Next, program processing of target course following control to be performed by the control unit 50 will be described with reference to a flowchart of FIG. 5.

In the program processing of the target course following control, in first step S101, a lane in which the own vehicle travels is recognized and the center of the traveling lane is set as a target course as the processing of the traveling road information acquirer 50a. In addition, the traveling road information acquirer 50a acquires the curvature κ of the target course, the deviation amount Δx between the target course and the own vehicle position in the width direction of the own vehicle 1, and the deviation amount θt in angle between the traveling direction of the target course and the traveling direction of the own vehicle 1 based on position information of recognized lane markings and position information of the target course.

Next, the processing proceeds to step S102 to check from the deviation amount Δx of the own vehicle 1 whether the traveling position of the own vehicle 1 is within the first control zone CZ1. As a result, when the own vehicle 1 is within the first control zone CZ1, the processing proceeds to step S103, the control ratio K between the steering control and the yaw moment control is set to K=0, and the processing proceeds to step S104. At this time, K=0, and the correction steering angle δth of the steering control is δth=0.

In step S104, the target yaw moment Mz to be applied to the own vehicle 1 is calculated. In the present embodiment, the target yaw moment Mz mainly includes the yaw moment Mzh corresponding to the correction steering angle δth (see the equation (6)). The processing proceeds to step S105 to calculate the motor torque Trl to be generated by the third motor 18 and the motor torque Trr to be generated by the second motor 17, and the motor torque Trl and the motor torque Trr are output to the third motor controller 27 and the second motor controller 26 respectively, thereby performing the yaw moment control.

The yaw moment control in the first control zone CZ1 is performed in a state where the target course is a straight road, the feedforward steering angle δtff is equal to 0 or the feedforward steering angle δtff along the target course becomes constant, so that there is no motion of the steering wheel 31 in short-time. Accordingly, it is possible to follow the target course smoothly and accurately without communicating unnecessary information to and bothering the driver with natural vehicle behavior.

On the other hand, when the traveling position of the own vehicle 1 is outside the first control zone CZ1 in step S102, the processing proceeds from step S102 to step S106 to set the control ratio K based on the deviation amount Δx. After the target steering angle δt and the target yaw moment Mz are calculated in step S107, the cooperative control of the steering control to the target steering angle δt and the yaw moment control based on the target yaw moment Mz is performed in step S108.

In the cooperative control of the steering control and the yaw moment control, when the deviation amount Δx of the own vehicle 1 from the target course is large, the control ratio K increases and the ratio at which the steering control occupies is larger as a whole than that of the yaw moment control. As a result, the control intention of the system for correcting the deviation from the target course can be clearly communicated to the driver by the motion of the steering wheel 31.

Thereafter, when the deviation amount Δx of the own vehicle 1 from the target course decreases, the control ratio K also decreases, and the motion of the steering wheel 31 slackens, so that the yaw moment control becomes dominant. As a result, it is possible to correct a small deviation from the target course without bothering the driver by calling unnecessary attention to the driver.

As described above, in the present embodiment, the traveling control for causing the own vehicle to travel along the target course is performed by using the steering control for controlling the steering system of the own vehicle and the yaw moment control based on the braking/driving force distribution of the wheels (between the right and left wheels). When the positional displacement of the own vehicle from the target course is corrected, the control ratio between the steering control and the braking/driving force distribution control is set based on the lateral positional deviation of the own vehicle from the target course in the vehicle width direction of the own vehicle. The control ratio is set so that the control ratio of the steering control increases as the lateral positional deviation of the own vehicle from the target course increases, whereas the control ratio of the steering control decreases as the lateral positional deviation decreases and the control ratio of the braking/driving force distribution control increases.

As a result, when the deviation of the lateral position of the own vehicle from the target course increases beyond a preset range, the cooperative control of the steering control and the yaw moment control is performed, and the ratio at which the steering control occupies is increased, whereby the control intention of the system can be communicated visually and instinctively to the driver by the motion of the steering system, and the positional displacement of the own vehicle from the target course can be corrected without causing the driver to feel uncomfortable. In addition, when the deviation of the lateral position of the own vehicle from the target course falls within the preset range and decreases, the positional displacement of the own vehicle from the target course is corrected based on a difference in the braking/driving force between the wheels by mainly performing the yaw moment control. As a result, the positional displacement can be corrected from an early stage without communicating unnecessary information to the driver.

In the present embodiment, the vehicle having the three electric motors has been described as an example. However, the vehicle is not limited to the above vehicle, and it may be, for example, a vehicle having in-wheel motors on four wheels, or a hybrid vehicle having an engine and an electric motor. In short, it goes without saying that the embodiment of the present technology can be applied to any vehicle insofar as the vehicle can apply a yaw moment to the vehicle by the difference in braking/driving force between the right and left wheels.

According to the embodiment of the present technology, when the positional displacement of the own vehicle from the target course is corrected, the control intention on the system side is appropriately communicated to the driver, and the positional displacement is corrected without causing the driver to feel uncomfortable, whereby the vehicle is enabled to follow the target course accurately.

The control unit 50 (see FIGS. 1 and 2) that performs traveling control for causing the own vehicle to travel along the shape of the target course can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control unit 50 (see FIG. 2) including the steering controller 50b, the braking/driving force controller 50c, and the control ratio setter 50d. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIGS. 1 and 2.

Although some embodiments of the technology have been described in the foregoing by way of example with reference to the accompanying drawings, the technology is by no means limited to the examples described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle traveling control device configured to control an own vehicle to travel along a target course, the device comprising:
   a steering controller configured to calculate a steering control amount for causing the own vehicle to travel along the target course, and control a steering system of the own vehicle on a basis of the calculated steering control amount;
   a braking/driving force controller configured to calculate a yaw moment to be applied to the own vehicle on a basis of a deviation amount of the own vehicle from the target course, and control a braking/driving force distribution of wheels on a basis of the calculated yaw moment; and
   a control ratio setter configured to set, on a basis of a lateral positional deviation in a vehicle width direction of the own vehicle from the target course, a control ratio of steering control by the steering controller and braking/driving force distribution control by the braking/driving force controller when a positional displacement of the own vehicle from the target course is corrected, and cause the steering control and the braking/driving force distribution control to be performed at the set control ratio, thereby correcting the positional displacement of the own vehicle from the target course,
   wherein the control ratio setter is configured to:
      when the lateral positional deviation is less than a first predetermined threshold value, set the control ratio of the steering control to zero;
      when the lateral positional deviation is more than a second predetermined threshold value more than the first predetermined threshold value, set the control ratio of the braking/driving force distribution control to zero; and
      when the lateral positional deviation is equal to or more than the first predetermined threshold value and is equal to or less than the second predetermined threshold value, increase the control ratio of the steering control linearly as the lateral positional deviation increases.

2. The vehicle traveling control device according to claim 1, wherein the steering controller is configured to calculate the steering control amount on a basis of a steering control amount of feedforward control on a basis of a curvature of the target course and a steering control amount of feedback control on the basis of the deviation amount of the own vehicle from the target course, and correct the steering control amount of the feedback control according to the control ratio.

3. The vehicle traveling control device according to claim 2, wherein the braking/driving force controller is configured to calculate a yaw moment corresponding to the steering control amount of the feedback control, and correct the calculated yaw moment according to the control ratio.

4. The vehicle traveling control device according to claim 3, wherein the deviation amount from the target course is a yaw-angle-to-lane of the own vehicle and the lateral positional deviation.

5. The vehicle traveling control device according to claim 2, wherein the deviation amount from the target course is a yaw-angle-to-lane of the own vehicle and the lateral positional deviation.

6. The vehicle traveling control device according to claim 1, wherein the deviation amount from the target course is a yaw-angle-to-lane of the own vehicle and the lateral positional deviation.

7. A vehicle traveling control device comprising circuitry configured to control an own vehicle to travel along a target course, the circuitry being configured to calculate a steering control amount for causing the own vehicle to travel along the target course, and controlling a steering system of the own vehicle on a basis of the calculated steering control amount, calculate a yaw moment to be applied to the own vehicle on a basis of a deviation amount of the own vehicle from the target course, and control a braking/driving force distribution of wheels on a basis of the calculated yaw moment, and on a basis of a lateral positional deviation in a vehicle width direction of the own vehicle from the target course, set a control ratio of steering control and braking/driving force distribution control when a positional displacement of the own vehicle from the target course is corrected, and causing the steering control and the braking/driving force distribution control to be performed at the set control ratio, thereby correcting the positional displacement of the own vehicle from the target course, wherein the circuitry is configured to:
  when the lateral positional deviation is less than a first predetermined threshold value, set the control ratio of the steering control to zero;
  when the lateral positional deviation is more than a second predetermined threshold value more than the first predetermined threshold value, set the control ratio of the braking/driving force distribution control to zero; and
  when the lateral positional deviation is equal to more than the first predetermined threshold value and is equal to or less than the second predetermined threshold value, increase the control ratio of the steering control linearly as the lateral positional deviation increases.

* * * * *